UNITED STATES PATENT OFFICE.

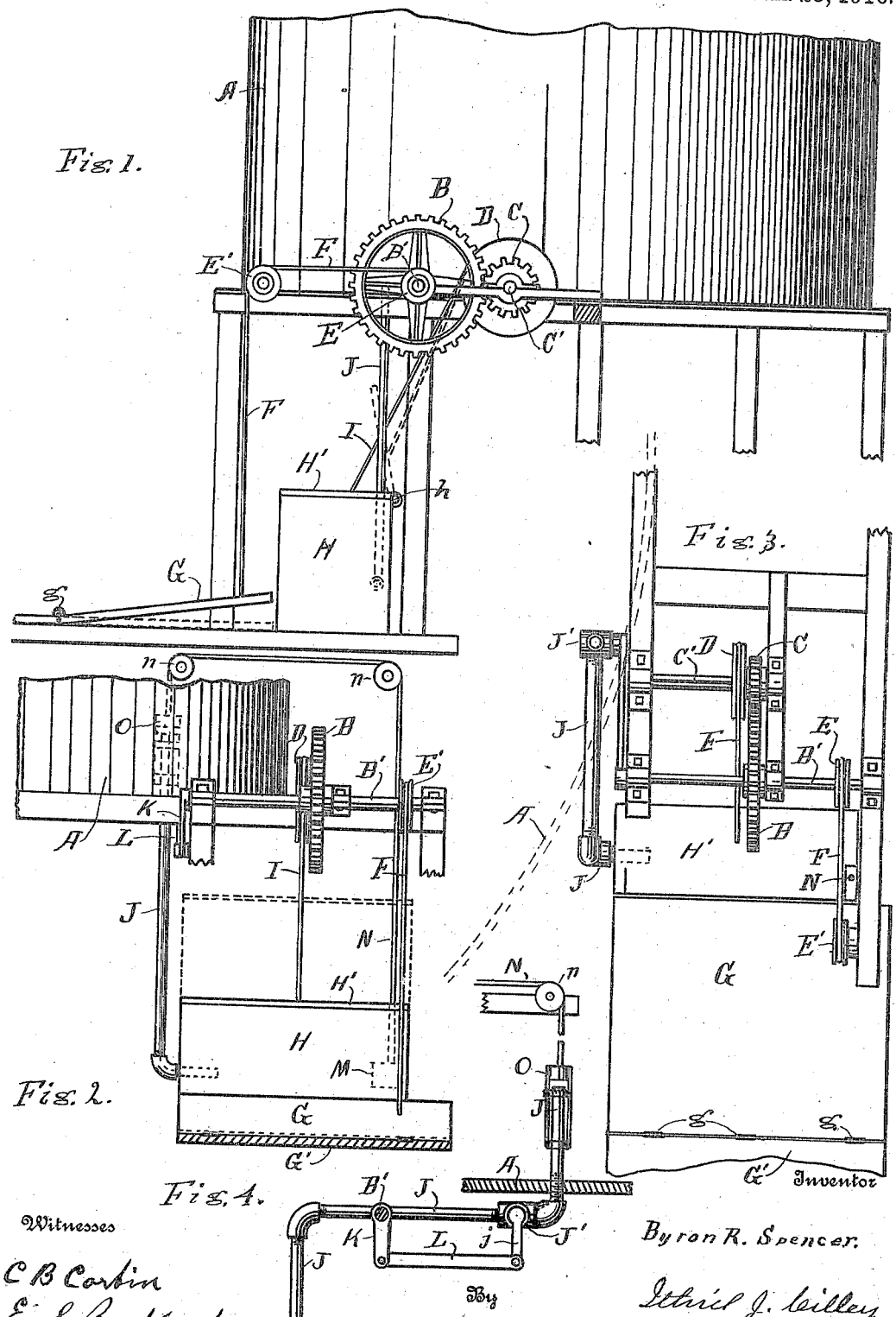

BYRON R. SPENCER, OF SPENCER, MICHIGAN.

WATERING-TROUGH.

947,704. Specification of Letters Patent. Patented Jan. 25, 1910.

Application filed May 5, 1909. Serial No. 494,723.

*To all whom it may concern:*

Be it known that I, BYRON R. SPENCER, a citizen of the United States, residing at Spencer, in the county of Kalkaska and State of Michigan, have invented certain new and useful Improvements in Watering-Troughs, of which the following is a specification.

My invention relates to improvements in watering troughs for farm stock, and its objects are: first, to provide a means whereby the cover of the trough will be opened when the animal approaches it, and, second, to provide a means whereby the flow of water to the trough will be opened when the animal approaches the trough and will be cut off when the animal goes away from the trough.

I attain these objects by the mechanism illustrated in the accompanying drawing, in which—

Figure 1 is an end elevation of the actuating mechanism as applied to a water tank. Fig. 2 is a side elevation of the same. Fig. 3 is a plan of the actuating mechanism and the trough and platform, and, Fig. 4 is an elevation of the water pipe that conducts water from the main tank or reservoir to the lesser tank or trough.
Similar letters refer to similar parts thoughout the several views.

A represents a portion of the main tank, or reservoir, which is elevated above the trough H, in the usual manner. The trough H has a cover H' hinged to it, as at $h$, and is connected with the tank A by means of a pipe J, so that water may be drawn from the tank to the trough.

The flow of water from the tank A to the trough H may be governed by the use of a float, in the usual manner, but I prefer that it be controlled by the approaching or retiring animal that is to drink from the trough, and for this purpose I place a stationary floor, G', with a movable platform G hinged thereto, as at $g$ $g$, so that one edge of this platform may be raised and lowered at pleasure. For operating this platform, and the cover H' of the trough H, I mount a shaft B' above the platform, with a counter-shaft C' mounted back of it. On the shaft B' I mount a gear wheel B and a small groved wheel E. To the wheel E I secure one end of a cable or cord F, which is passed over a sheave, E', and thence down to the surface of the platform G, to which it is secured at the other end.

The gear wheel B is made to mesh with a small gear wheel C, on the shaft C'. I also mount a sheave, D, upon the shaft C', and attach one end of a cable or cord I to this sheave, and attach the other end of this cord to the cover H' of the trough H, in such a position that the weight of the cover H' will hold the platform G, normally in the position indicated by the solid lines in Figs. 1 and 2, and so arranged that when a cow, a sheep, a horse, or other animal walks upon the platform G, this platform will be pressed down to the position indicated by its dotted lines in Fig. 1. This movement of the platform G will, through the medium of the cords F and I, and the gear wheels B and C and the sheave D, cause the cover H' of the trough, to raise to the position indicated by its dotted lines in Figs. 1 and 2, so that the animal may easily get its head into the trough to drink. When the cover H' is thus raised it should stand at an incline from the perpendicular, sufficiently far so that its weight will readily raise the platform to normal position as soon as the animal has stepped off of the platform.

Ordinarily, the flow of water from the tank A to the trough H, is regulated by means of a float and valve, the construction of which, is so well known that it is not deemed necessary to particularly describe and illustrate it, except as an auxiliary element, as I have provided, in this construction, to actuate the water valve by means of the movement of the platform G, which is accomplished as follows: I mount a cut-off and waste valve, J', in the line of pipe J, and place thereon a handle or lever $j$, by means of which the valve may be opened and closed to turn on, or cut off the flow of water from the tank A to the trough H, and to accomplish this through the medium of the platform G and its connections to the shaft B', I place a crank K on the shaft B' and secure one end of a connecting rod L to the end of this crank, and the other end of this connecting rod to the end of the lever $j$ in the valve J', as shown in Fig. 4, so that any motion of the shaft B, will be carried to the lever $j$ to open or close the valve J', and it is so adjusted that when the platform G is in normal position the valve will be closed and no water can pass through the pipe J from the tank A to the trough H, but as soon as the platform is carried downward by the weight of stock upon it, the valve will be opened and a free flow of water may pass from the tank to the trough, sufficient to quench the thirst of the stock drinking.

Animals may, at times, remain upon the platform G for some time after they have ceased to drink, and thus endanger the waste of water by overflowing the trough, and to avert this, any form of float attachment may be applied, that may be utilized for the purpose. Thus: a float M, may be placed in the trough in a position to be raised as the water rises in the trough, and a weighted valve cap, O placed at the upper end of the pipe J, inside of the tank A, and the two connected by a cord N, properly supported, as at n n, so that the weight of the valve cap O will cause it to settle down over the top of the pipe J and close it so water cannot pass through the pipe, as the float M is raised by the rising water in the trough H. It will be seen that by this arrangement, or its equivalent, water will continue to flow into the trough as long as the animal continues to drink, but as soon as it ceases to drink and still remains upon the platform, allowing the water to continue to flow, the flow will be stopped as soon as water has risen high enough in the trough to allow the valve cap O to rest upon the top of the pipe J in the tank.

In Fig. 3 I have shown the outline, only, of the side of the tank adjacent to the actuating mechanism, for the purpose of more fully showing the application of the pipe J and the valve J'.

Having thus described my invention, what I claim as new, and desire to secure by Letters Patent of the United States, is:

1. In combination with a water tank and a watering trough connected therewith, a platform adjacent to the trough and pivoted to raise and lower as weight is placed upon, and removed from it, a cover hinged to the trough, a cord secured at one end to the platform and another cord secured at one end to the trough cover, and intermediate gear wheels and sheaves so arranged that the vertical movement of the platform will be carried to the trough cover to open and close it.

2. In combination with a water tank, a watering trough, and a water pipe connecting the two, a vertically movable platform adjacent to the trough, a cover hinged to the trough, a cord attached at one end to the platform and a cord attached at one end to the trough cover, an intermediate gear and sheave mechanism to which the other ends of the cords are secured in such a manner that any movement of the platform or the trough cover will be carried to the other, and a valve connected in the line of water-pipe and with the gear mechanism so that the vertical movement of the platform will open and close the valve.

3. In combination with a water tank, a watering trough, and a water pipe connecting the tank and the trough, a series of gear wheels and sheaves mounted near the tank, a cord connected at one end to the trough cover and at the other end to a sheave in the series, a vertically movable platform adjacent to the trough, a cord attached at one end to the platform and at the other end to another of the series of sheaves, the sheaves and gear wheels arranged to transmit the vertical movement of the platform to the cover, and vice versa, a cut-off and waste valve in the line of water pipe and connected with the gear mechanism in such a way that the vertical movement of the platform will open and close the valve, and a float and weight mechanism so connected in the tank and the trough that the flow of water from the tank to the trough will be shut off when a given depth of water has flowed into the trough.

4. In combination with a water tank, a watering trough, and a water pipe connecting the tank and the trough, a hinged platform adjacent to the trough made to move vertically, a cover hinged to the trough to open and close vertically, a series of gear wheels, sheaves and shafts adjacent to the tank and so connected with the cover and the platform that the movement of the one will be transmitted to the other, and means whereby the flow of water from the tank to the trough will be so governed as to insure the necessary supply in the trough without danger of wasting water therefrom.

5. In combination with a water tank, a watering trough, and a water pipe connecting the water tank with the trough, a series of gear wheels and sheaves adjacent to the tank, a vertically movable platform adjacent to the trough, a cover hinged to the trough, cords connecting the cover with one of the series of sheaves, a cord connecting the platform with another of the series of sheaves in such a way that the vertical movement of the one will be transmitted to the other, and valves and floats so arranged in the tank, the pipe and the trough that the flow of water from the tank to the trough will be regulated by the movement of the platform and the amount of water flowing into the trough.

Signed at Grand Rapids Michigan April 20, 1909.

BYRON R. SPENCER.

In presence of—
  I. J. CILLEY,
  EDWARD L. GOUGH.